United States Patent
Miller

[15] 3,657,963
[45] Apr. 25, 1972

[54] ROTARY TILTING TABLE

[72] Inventor: Richard K. Miller, 735 Washington, Grosse Pointe, Mich. 48230

[22] Filed: Jan. 12, 1970

[21] Appl. No.: 2,338

[52] U.S. Cl. ............................... 90/58 C, 269/61, 269/73, 269/74, 408/90
[51] Int. Cl. .......................................................... B23d 7/08
[58] Field of Search ......... 77/63 A, 64, 63; 90/58 C, DIG. 21; 269/60, 61, 73, 74; 408/90

[56] References Cited

UNITED STATES PATENTS

| | | | |
|---|---|---|---|
| 1,292,235 | 1/1919 | Beckett | 269/61 |
| 2,378,912 | 6/1945 | Collins | 269/61 |
| 1,917,831 | 7/1933 | Fairbairn | 77/63 A |
| 3,386,277 | 6/1968 | Hennings | 77/63 X |
| 3,228,266 | 1/1966 | Budney et al. | 77/63 X |

*Primary Examiner*—Andrew R. Juhasz
*Assistant Examiner*—James F. Coan
*Attorney*—Harness, Dickey & Pierce

[57] ABSTRACT

In combination in a rotatable tilting workpiece support apparatus, a table assembly comprising a relatively tiltable table carriage and a workpiece support table mounted on the carriage and adapted for rotational movement relative thereto, a support assembly, and means supporting the table assembly for tilting movement on the support assembly, the last mentioned means including a pair of spaced apart, cradle-like support elements on one of the assemblies and means on the other of the assemblies nestingly engageable with the elements, whereby the table and the workpiece carried thereon are rotatable relative to the carriage and the support assembly, and the carriage, table and the workpiece carried thereon are tiltable relative to the support assembly.

14 Claims, 6 Drawing Figures

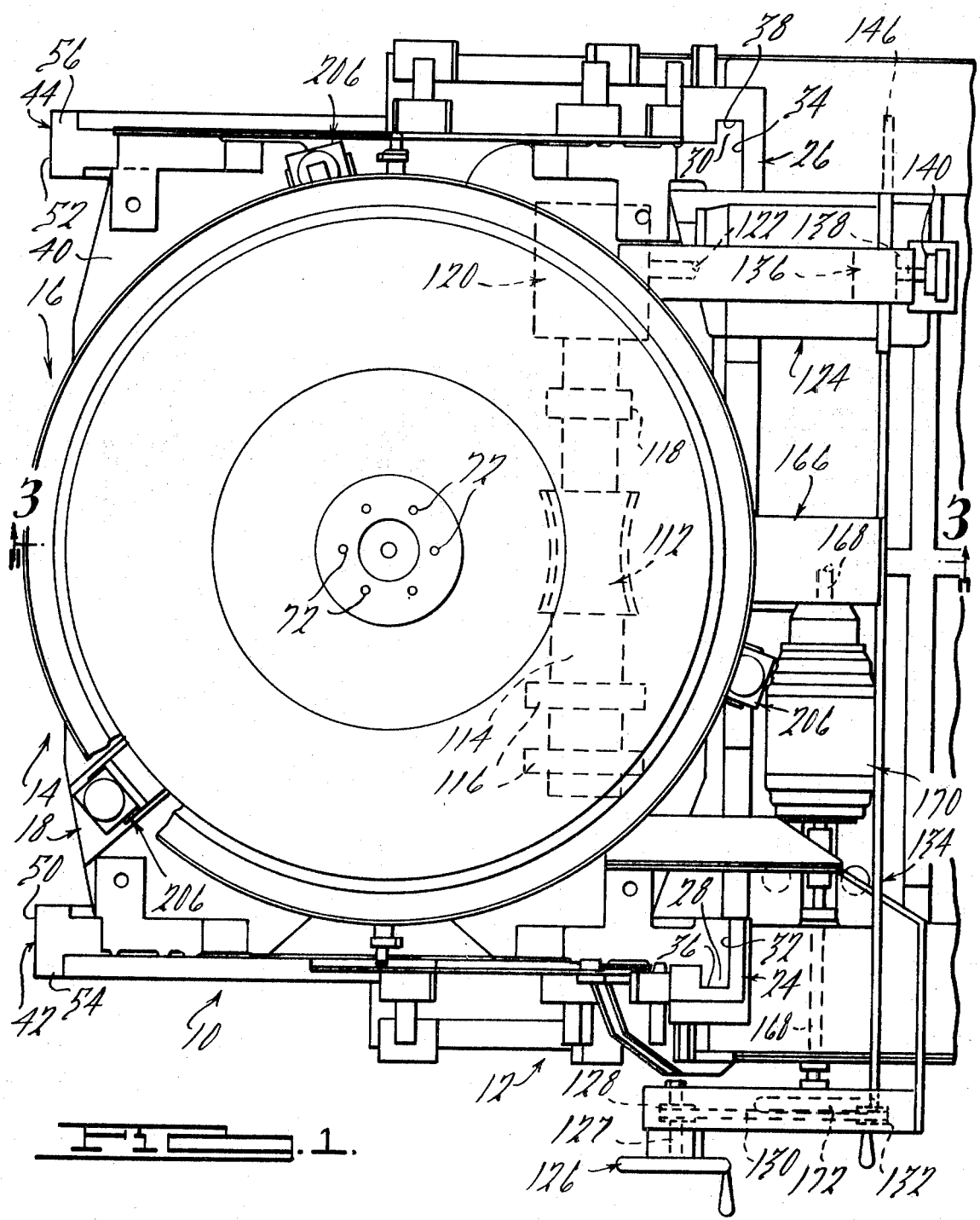

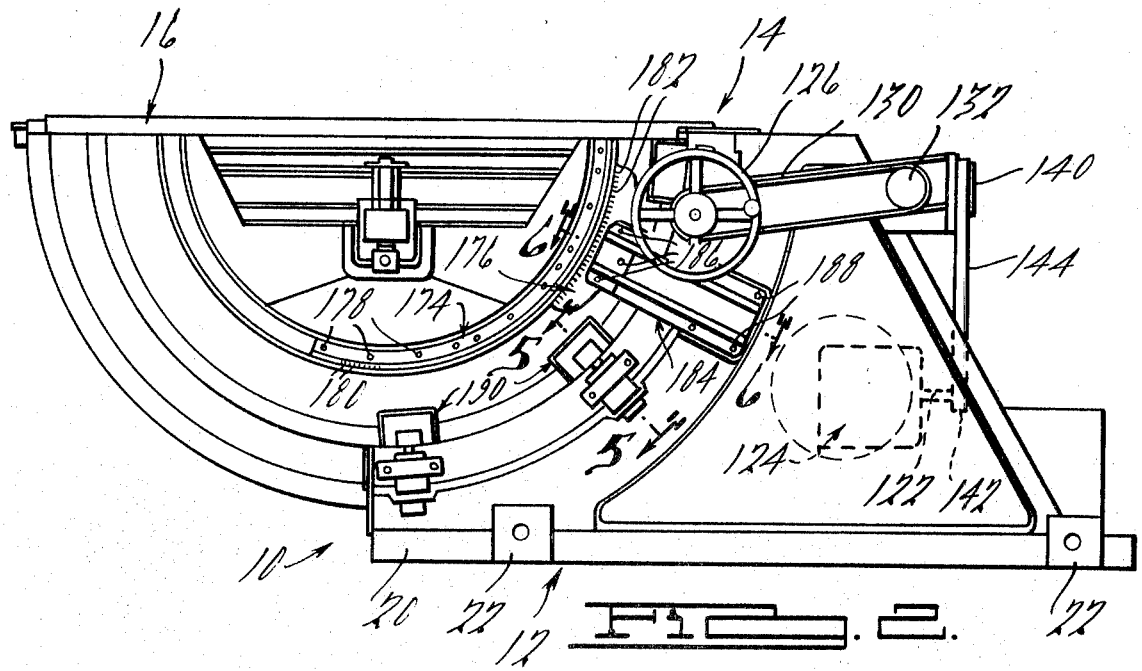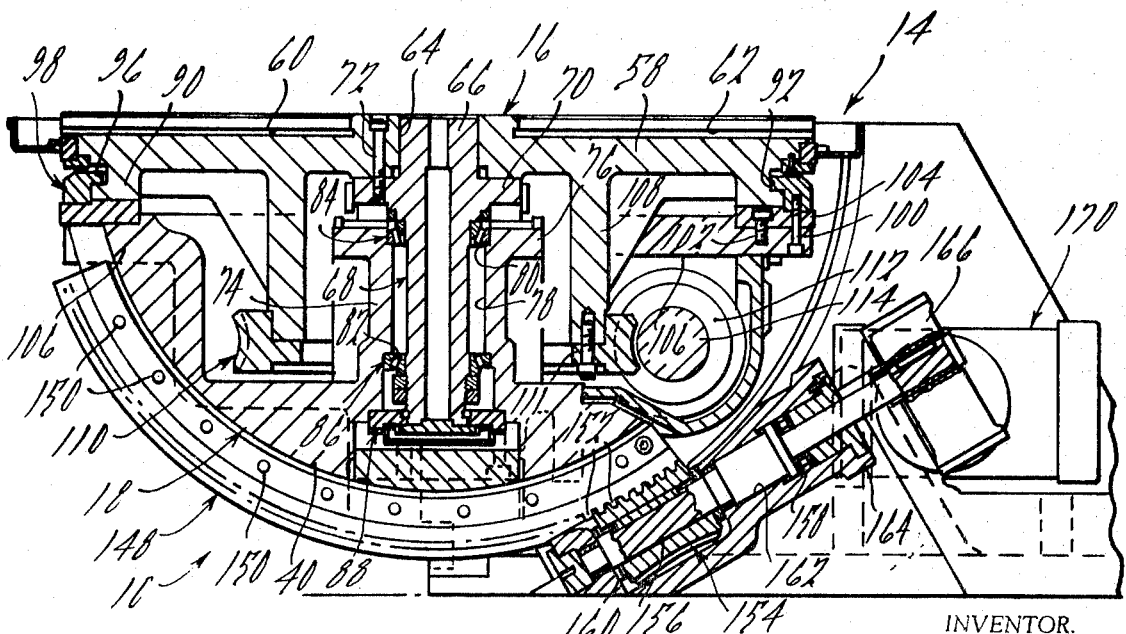

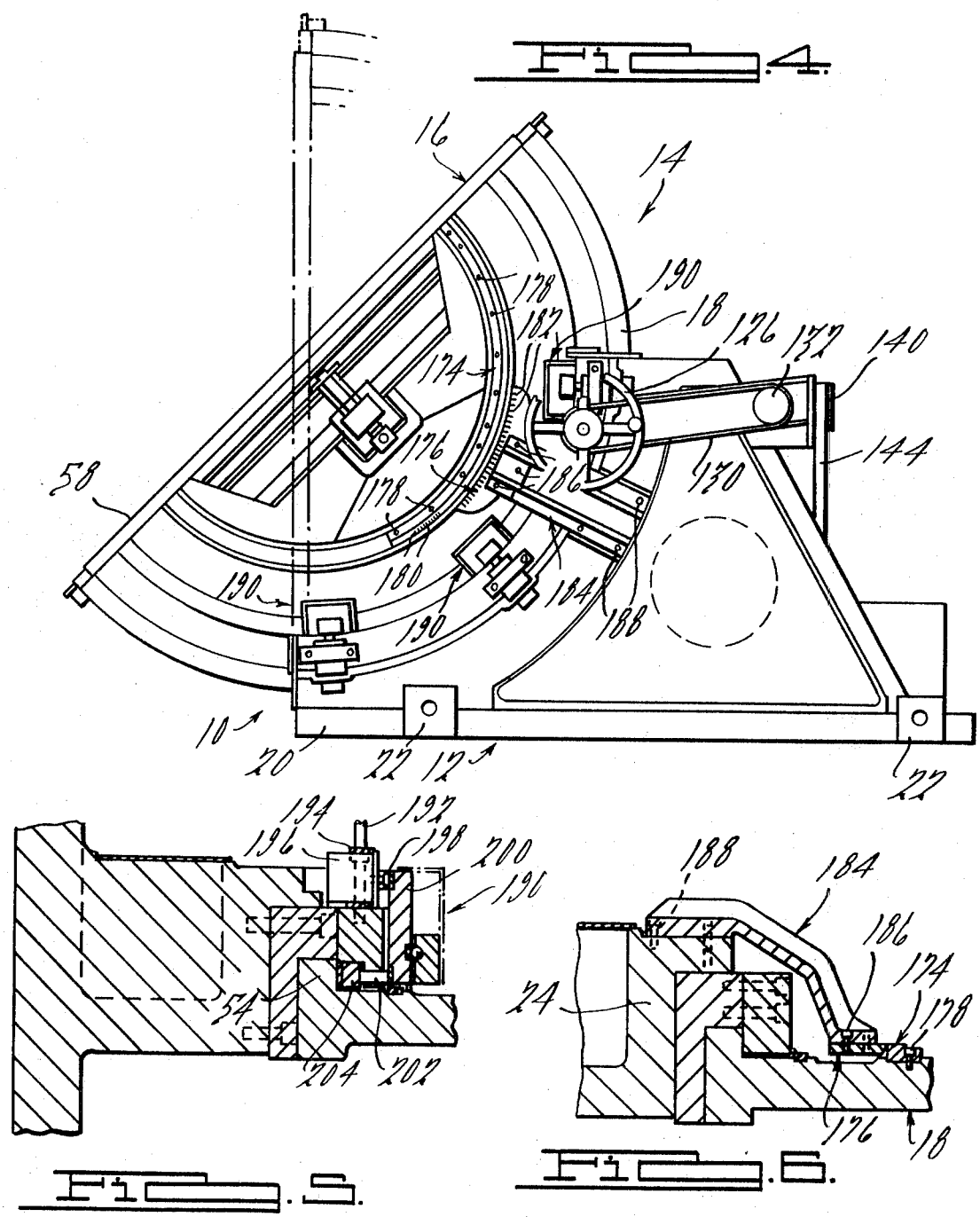

ROTARY TILTING TABLE

BACKGROUND OF THE INVENTION

It has heretofore been the practice in the machining art to operatively position workpieces that are to have machining operations performed thereon upon a workpiece supporting table having a face plate that is both rotatable and tiltable. Such rotary tilting tables are thus particularly adapted for many types of machining operations, such as boring, drilling, milling, etc., and have found substantial commercial acceptance for use in experimental layout work, process inspection and virtually anywhere where radial and tilting accuracy is required.

While the various rotary tilting tables heretofore known and used have been found to be very satisfactory for use in handling relatively small and moderate size workpieces, one particularly objectionable feature of such tables, where relatively large workpieces are being handled, has resided in the lack of stability and vibration thereof during heavy machining operations. This has been due primarily to the fact that the tilting feature thereof has been accomplished by supporting the rotary face plate upon a transverse shaft or axle that is rotatably or pivotably mounted at its opposite ends by means of a pair of spaced trunnion assemblies. It has been necessary, where relatively large workpieces are to be machined through the use of machining equipment applying relatively large loading to the workpieces, to construct the face plates, support shafts or axles and trunnion assemblies therefore of an inordinately massive size and construction, with the result that both the cost and inconvenience involved in supporting and selectively adjusting the workpieces preparatory to, during and after a machining operation was extremely burdensome. Additionally, such heretofore known and used devices have been objectionable due to the relatively complex gear trains and oversize bearings that have been required for operatively positioning and supporting the face plates thereof.

The present invention is directed toward a new and improved rotary tilting table which is intended to overcome the objectionable features of similar type equipment heretofore known and used through the provision of a novel apparatus which eliminates the need for support trunnions and the associated bearing assemblies, support axles and the like heretofore employed in such devices. More particularly, the present invention is directed toward a new and improved rotary tilting table which utilizes a support structure assembly comprising a pair of spaced cradle-like elements which define a pair of curvalinear support surfaces adapted to contiguously engage a pair of spaced apart end sections of a rotary table carriage member. The carriage member is so supported upon the cradle-like elements such that extreme stability of the workpiece supporting face plate is achieved, even in situations where extremely massive workpieces are supported thereon and where relatively large workpiece loading is exerted by the associated machine tools performing machining operations thereon. The aforementioned stability is achieved without any sacrifice in size so that the present invention provides a workpiece supporting table which is both extremely rugged in operation and compact in size. Additionally, the rotary tilting table of the present invention obviates the need for any complicated gear trains or the like heretofore required on similar type devices, which results in the apparatus of the present invention being of a relatively simple design, economical to manufacture and easy to assemble.

SUMMARY OF THE INVENTION

This invention relates generally to an apparatus for handling and supporting workpieces during a machining and/or inspection operation, and, more particularly, to an apparatus for rotatably and tiltably supporting a workpiece.

It is accordingly a general object of the present invention to provide a new and improved rotary tilting table for use in operatively and adjustably supporting a workpiece.

It is a more particular object of the present invention to provide a new and improved rotary tilting table which overcomes the objectionable features of similar type tables heretofore known and used.

It is another object of the present invention to provide a new and improved rotary tilting table which is of an extremely compact and structurally stable construction.

It is a further object of the present invention to provide a new and improved rotary tilting table which obviates the need for any trunnion support assemblies by utilizing a pair of cradle-like elements adapted to support the rotary table and table carriage for relative tilting movement.

It is yet another object of the present invention to provide a new and improved rotary tilting table which eliminates the need for any complicated gear trains, and which is capable of supporting relatively large loads.

It is still another object of the present invention to provide a new and improved rotary tilting table which features the use of a plurality of clamping devices for clampingly securing the rotary table and table carriage in a preselected orientation or attitude.

Other objects and advantages of the present invention will become apparent from the following detailed description taken in conjunction with the accompanying drawings.

BRIEF DESCRIPTION OF THE DRAWINGS

FIG. 1 is a top elevational view of a rotary tilting table of the present invention;

FIG. 2 is a side elevational view of the apparatus illustrated in FIG. 1;

FIG. 3 is a transverse cross-sectional view of the rotary tilting table of the present invention;

FIG. 4 is a side elevational view similar to FIG. 3 and illustrates how the table carriage and workpiece support table are tiltable from a generally horizontal attitude to a generally vertical orientation;

FIG. 5 is an enlarged fragmentary view taken substantially along the line 5—5 of FIG. 2, and FIG. 6 is an enlarged fragmentary cross-sectional view taken substantially along the line 6—6 of FIG. 2.

DETAILED DESCRIPTION OF A PREFERRED EMBODIMENT

Referring now in detail to the drawings and in particular to FIGS. 1 through 3, a rotary tilting table 10, in accordance with a preferred embodiment of the present invention, is shown generally as comprising a lower support assembly 12 and an upper table assembly 14, the latter of which comprises a generally circular-shaped workpiece supporting table 16 that is rotatably supported upon a table carriage 18. As will be hereinafter described in detail, the table 16 is adapted to be rotatably supported by means of the table carriage 18, while both of these members are adapted to be supported upon the support assembly 12 for relative tilting movement, for example, from the position shown in FIGS. 2 and 3 wherein the table 16 is in a generally horizontal attitude, to the position shown in FIG. 4 wherein the table 16 is relatively inclined or is disposed in a generally vertical attitude, whereby to selectively position one or more workpieces secured to and carried upon the table 16 with respect to an associated machine tool or operator performing some manufacturing operation on the workpieces.

The support assembly 12 generally comprises a flat, horizontally extending base section 20 which is provided with one or more mounting lugs or the like 22 adapted to be used in securing the table 10 to any suitable support structure. Disposed at the laterally opposite sides of the base section 20 is a pair of spaced apart generally vertically upwardly extending cradle-like elements or support sections, generally designated 24 and 26. The support sections 24 and 26 define a pair of arcuate or curvalinear guideways 28 and 30, respectively, upon which the table carriage 18 is operatively mounted. The guideways 28, 30 define a pair of cylindrical surfaces 32 and 34, respectively, which lie along the periphery of a common imaginary cylinder, the axis of which extends horizontally and is coaxial with the axis of tilting or pivotal movement of the table carriage 18 and table 16. That is, the guideways 28 and 30 lie along common sectors of a pair of imaginary circles having a common axis or center with the axis of tilting of the table assembly 14, the sectors being approximately one-fourth or 90° of such circles, as illustrated in FIG. 2. The surfaces 32, 34 terminate at their laterally outer edges in a pair of laterally outwardly extending arcuate recesses 36 and 38 which are coextensive of the surfaces 32, 34 and function in a manner hereinafter to be described in supporting the table carriage 18 upon the support assembly 12. In a preferred construction of the present invention, the cradle-like support sections 24, 26 are formed integral of the base section 20, and all of which sections 20, 24 and 26 are preferably fabricated of a suitable cast ferrous material upon which the guideways 28, 30 may be, precision machined.

Referring now in detail to the construction of the table carriage 18, as best seen in FIG. 3, the carriage 18 comprises a laterally extending intermediate section 40 which is provided with a pair of integral side support sections 42 and 44. The sections 42, 44 are semi-circular in shape, i.e., lie along the circumference of a common imaginary circle having a radius equal to the radius of the imaginary circle or sectors thereof defining the guideways 28, and 30. The sections 42, 44 define a pair of bearing surfaces 50 and 52 which are adapted for contiguous engagement with the surfaces 32 and 34, respectively, with the laterally outer marginal edges of the surfaces 50, 52, terminating in laterally outwardly extending flange or shoulder portions 54 and 56 which are adapted to be nestingly received within the recesses 36, 38 of the guideways 28, 30, respectively. It will be seen that with the surfaces 50 and 52 engaged with the surfaces 32 and 34 and the shoulders 54, 56 received within the recesses 36, 38, respectively, the table carriage 18 will be slidably supported upon the guideways 28 and 30 for tilting movement between the relative angular positions shown in FIGS. 1 through 4, whereby workpieces mounted upon the support table 16 may be oriented at different angular positions with respect to their associated machine tool or the like. It will be appreciated, of course, that while the above described guideway construction is preferred in tiltably supporting the table carriage 18 upon the support assembly 12, various alternate arrangements may be used without departing from the scope of the present invention.

The support table 16, as best seen in FIG. 3, comprises a generally flat circular face plate section 58, the workpiece supporting surface of which may be provided with a plurality of radially outwardly and/or circumferentially extending T-shaped grooves or the like 60 and 62 which may be used in a conventional manner for attaching workpieces to be machined, inspected, etc., to the table 16. The face plate section 58 is formed with a central annular opening or bore 64 within which an upper end section 66 of a central support column, generally designated 68, is received and fixedly secured. The column 68 is provided with a radially outwardly extending flange section 70 which is adapted to be secured by means of a plurality of suitable screws, bolts or the like 72, to the underside of the face plate section 58, whereby to secure the column 68 and table 16 against any relative rotational movement therebetween. The lower end of the support column 68 extends downwardly and centrally within an annular enclosure section 74 formed integrally of the intermediate section 40 of the table carriage 18, with the upper end of the section 74 defining a radially outwardly extending shoulder portion 76 which is spaced slightly below the lower surface of the flange section 70 and is adapted to cooperate therewith in operatively supporting measuring instrumentation with which the table 10 may be supplied, as will later be described. The enclosure section 74 defines an axially extending bore 78 through which the support column 68 longitudinally extends, with the bore 78 defining a pair of generally vertically spaced shoulders 80 and 82 which are adapted to support a pair of anti-friction bearing assemblies 84 and 86 that function to rotatably support the column 68, and hence the support table 16, upon the table carriage 18. The lower end of the support column 68 is provided with a retaining assembly, generally designated 88, which functions to retain the same within the bore 78 and assure against any relative axial movement thereof with respect to the table carriage 18.

Extending downwardly from the lower side of the face plate section 58 of the support table 16 adjacent the outer marginal edge thereof is an integral retaining flange or shoulder 90 which defines a peripheral outwardly exposed groove or recess 92. The recess 92 is adapted to nestingly receive a radially inwardly projecting shoulder portion 96 of an annular mounting ring member 98 which is secured through suitable screws, bolts or the like 100, 102 and an intermediate member 104 to a generally flat, radially extending platform section 106 of the table carriage 18. The ring member 98 and shoulder 90 are adapted to cooperate in stabilizing the support table 16 and guiding the same for rotational movement about a central axis defined by the central support column 68, whereby to assure against any vibrational or other undesirable movement of the face plate section 58 and workpieces mounted thereon while the latter are undergoing a manufacturing or inspection operation.

Disposed radially interjacent the bore 64 and shoulder 90 of the table 16 is an annular drive sleeve or collar section 108 which is arranged coaxially of the axis of rotation of the table 16 and is integrally connected at its upper end to the underside of the face plate section 58. The lower end of the drive section 108 is adapted to have an annular ring gear member 110 fixedly secured thereto by means of suitable screws, bolts or the like 111, which gear member 110 is adapted to function in a manner hereinafter to be described in rotating the support table 16 and workpieces carried thereon.

Means for effecting rotation of the ring gear 110 and hence rotation of the support table 16 is provided by a worm gear member 112 which, as best illustrated in FIG. 1, is rotatably mounted upon a drive shaft 114 that is rotatably supported within the table carriage 18 by means of a plurality of anti-friction bearing assemblies 116 and 118. One end of the shaft 114 is adapted to be drivingly connected to a suitable right angle drive mechanism which may be of any suitable construction and is designated by the numeral 120. The drive mechanism 120 is in turn drivingly connected through a shaft member 122 to a drive motor, respresentatively designated by the numeral 124, which is also mounted within the table carriage 18. The motor 124 is preferably, although not necessarily, fluid operated and it is therefore adapted to be communicable with any suitable source of pressurized actuating fluid as is readily available.

In situations where it is desirable to effect rotation of the support table 16 manually instead of through actuation of the motor 124, the rotary tilting table 10 of the present invention may be and preferably is provided with one or more manually actuatable wheels for effecting the desired rotation of the support table 16. Such a wheel is shown in FIGS. 1, 2 and 4 and is representatively designated by the numeral 126. The wheel 126 is rotatably connected to one end of a drive shaft 127 which carries a suitable drive sheave or pulley 128. The pulley 128 is drivingly connected via a suitable endless drive belt or the like 130 with another pulley 132 which is mounted at one end of a transversely extending drive shaft, generally designated 134. The end of the shaft 134 opposite the pulley 128 is drivingly connected to a suitable right angle drive mechanism 136 that is provided with an output shaft 138 carrying a drive pulley or sheave 140. As illustrated in FIG. 2, the pulley 140 is drivingly connected with an associated pulley 142 through a suitable downwardly extending endless drive belt 144, the pulley 142 being operatively mounted at one end of the shaft member 122 of the aforemention drive motor 124.

In normal operation of the rotary tilting table 10 of the present invention, the motor 124 is appropriately energized to effect the desired rotation of the support table 16, and the motor 124 may therefore be energized for a sufficient amount of time to rotate the table 16 to approximately some predetermined rotational position, after which time the motor 124 will be deenergized. Thereafter, the table 16 may be precisely oriented by rotating the wheel 126 to effect rotation of the drive shafts 127 and 134, which in turn effects rotation of the shaft member 122 of the motor 124 via the drive belts 130 and 144. This, in turn effects rotation of the ring gear 110 via rotation of the worm gear 112, resulting in preselected rotational movement of the support table 16. Thus, approximate rotational positioning of the support table 16 may be achieved through the operation of the motor 124, while fine or precise rotational adjustment thereof may be achieved by means of the manual adjustment wheel 126. It may be noted that suitable one-way clutch means or the like may be interposed between the drive motor 124 and the manually adjustable means hereinabove described so that said manually adjustment means will not operate during the time the motor 124 is operating. Additionally, a second manual adjustment wheel may be provided on the opposite side of the rotary tilting table 10 from the wheel 126 where it is desired to provide for manual adjustment on each side thereof, with such second wheel being appropriately connected to an extension of the drive shaft 134, as indicated at 146 in FIG. 1. It will be appreciated, of course, that the entire rotary drive system hereinabove described for rotating the support table 16, either manually or with the motor 124, is operatively mounted upon the table carriage 18 and hence moves with the carriage 18 and support table 16 as the same are tilted in a manner shown in FIG. 4, with the result that the support table 16 may be rotated to some preselected position regardless of the tilted attitude thereof.

The description is now directed to the means for effecting tilting movement of the table carriage 18 and support table 16 thereon, which means consists in part of an elongated arcuate-shaped segmental drive gear or rack, generally designated 148, which is fixedly secured by means of suitable screws, bolts or the like 150 to the underside of the intermediate section 40 of the table carriage 18, as best seen in FIG. 3. The rack 148 is provided with a downwardly directed tools formation 152 which is adapted to be meshingly engaged with a cooperable worm gear member 154 that is mounted at one end of an upwardly and rearwardly inclined drive shaft 156. The shaft 156 is rotatably supported by means of suitable antifriction bearings or the like 158 and 160 within an upwardly and rearwardly inclined bore 162 formed integrally of the base section 20 of the support assembly 12 intermediate the cradle support elements 24 and 26, as indicated at 164 in FIG. 3. The end of the drive shaft 156 opposite that which is connected to the worm gear 154 is operatively connected via a suitable right angle drive mechanism 166 with a transversely extending drive shaft 168 that is drivingly connected to a suitable drive motor 170 that is similar in construction and operation to the aforedescribed motor 124 and like the motor 124, is preferably fluid operated. It will be seen that upon proper energization of the motor 170, the shaft 168 will rotate, thereby effecting rotation of the drive shaft 156 through the drive mechanism 166, resulting in rotation of the worm gear 154 which in turn causes the rack 148 to advance in a generally counterclockwise direction in FIG. 3, whereby the support table 16 will be pivoted or tilted from the position shown in this Figure toward one of the positions shown in FIG. 4.

The drive shaft 168 of the motor 170 preferably extends laterally outwardly (downwardly in FIG. 1) and is provided at the outer end thereof with a manually engageable wheel 172 which may be manually rotated to provide for fine tilting adjustment of the table carriage 18 and support table 16 thereon. It will be appreciated, of course, that the shaft 168 may project laterally outwardly in the opposite direction from the handle 172 and be provided with a second adjustable wheel (not shown) when it is desired to provide for manual tilting adjustment at both sides of the rotary tilting table 10 of the present invention.

The motors 124 and 170 are preferably of the variable speed type so as to provide for slow, intermediate and fast rotation and tilting of the support table 16 without requiring that the drive or adjustment of either the support table 16 or table carriage 18 be provided with any relatively complicated drive trains, gears, transmissions, etc., thereby simplifying to the extreme the adjustment mechanisms required for effecting rotation and tilting of the support table 16 and reducing the cost and maintenance to a minimum of the apparatus 10 of the present invention.

It is highly desirable that the rotary tilting table 10 of the present invention be provided with some type of measuring indicia or reference marks for facilitating selective rotation of the support table 16 and tilting of the table carriage 18 to some predetermined rotational position and angular attitude. By way of example, such reference indicia may be provided by a pair of cooperable reference plates, generally designated 174 and 176, the former of which is of an elongated arcuate configuration and is mounted on the support section 42 of the table carriage 18 by means of a plurality of suitable screws, bolts or the like 178. The plate 174 is provided with a plurality of incremental indicia or reference marks, representatively designated by the numeral 180, that are adapted to be selectively registered with cooperable reference marks 182 provided on the plate 176 which, as best shown in FIGS. 2 and 4, is mounted on one end of an elongated support bracket 184 by means of suitable screws, bolts or the like 186. The opposite end of the bracket 184 is secured by means of suitable screws, bolts or the like 188 to the support section 24 of the support assembly 12. The plate 176 has the edge thereof adjacent the plate 174 formed in a generally arcuate configuration complementary to the shape of the plate 174, whereby the respective indicia or reference marks 180 and 182 thereof are disposed in close proximate relation to facilitate the operator aligning the various indicia 180, 182 to effect preselected angular tilting of the table carriage 18. It will be appreciated, of course, that a similar type arrangement may be provided to facilitate selective rotational positioning of the support table 16 when desired, and a detailed description of such means will be omitted for purposes of simplicity of disclosure.

In accordance with one of the principles of the present invention, means in the form of a plurality of clamping assemblies is provided on the rotary tilting table 10 for clampingly securing the support table 16 in a preselected rotational position and the table carriage 18 in a preselected tilted or angular position, whereby the face plate section 58 of the support table 16 may be positively and rigidly secured in a preselected position during a machining operation on a workpiece carried thereby. By way of example, the clamping means for clampingly securing the table carriage 18 in a preselected tilted or angular relationship is provided by three arcuately spaced clamping mechanisms, generally designated 190, provided on each of the support sections 24 and 26 of the support assembly 12 and adapted to clampingly engage the laterally outwardly projecting shoulder portions 54 and 56 of the side support sections 42 and 44 of the table carriage 18. More particularly and as best illustrated in FIGS. 2, 4 and 5, each of the clamping mechanisms 190 is preferably fluid pressure actuated and is adapted to be communicable with a suitable source of fluid pressure via conventional fluid conduit means, representatively designated by the numeral 192. The conduit means 192 is communicable with each of the mechanisms by suitable fluid fitting means 194 connected to a manifold housing 196 within which a fluid actuated piston or plunger 198 is reciprocally mounted. The piston 198 of each of the mechanisms 190 is adapted to exert an outwardly directed force against one end of a generally pivotably mounted lever arm 200, the opposite end of which member 200 is adapted to exert an inwardly directed force against a cooperable plunger 202 having a pressure pad 204 adapted to exert a compressive force against the associated shoulder portion 54 or 56 of the associated side of the table carriage 18. Therefore, at such time as it is desired to clampingly secure the table carriage 18 in some preselected angular position to which it has been tilted, pressurized fluid is communicated via the conduits 192 to the clamping mechanisms 190, resulting in the pressure pads 204 simultaneously compressingly engaging the shoulders 54 and 56, thereby positively securing the table carriage 18 in said preselected position. At such time as it is desired to reposition the table carriage 18, the fluid pressure communicated to the clamping mechanisms 190 is relieved, whereby the compressive force exerted against the shoulder portions 54, 56 is alleviated to permit the desired adjustment. It will be appreciated, of course, that various alternative types of clamping arrangements may be used without departing from the scope of the present invention.

Similar type clamping mechanisms, herein designated by the numeral 206, may be and preferably are provided for fixedly securing the support table 16 in preselected rotational positions, whereby to positively assure against any relative movement thereof with respect to the table carriage 18. By way of example, three of such clamping mechanisms 206 are shown in FIG. 1 as being fixedly secured to the table carriage 18 at positions generally equally circumferentially spaced around the periphery of the support table 16. Like the clamping mechanisms 190, the mechanisms 206 are preferably fluid pressure operated so as to exert a clamping force against the outer periphery of the support table 16 in a manner similar to the action of the clamping mechanisms 190 on the table carriage 18.

Where desired, the rotary tilting table 10 of the present invention may be provided with suitable measuring instrumentation for accurately sensing the rotational position of the support table 16. By way of example, one precision angular sensing device, distributed under the tradename "Inductosyn," has been found to be highly successful and the various component parts thereof will be found to operate satisfactorily when mounted interjacent the flange sections 70 and the shoulder portion 76, hereinbefore described, whereby such angular measuring or sensing equipment will be entirely contained within the confines of the table carriage 18 and thus will be movable (tiltable) therewith for sensing the rotational or angular position of the support table 16, regardless of the tilted attitude of the table carriage 18.

It will be seen from the foregoing that the present invention provides a new and improved rotary tilting table which will be found to overcome the many objectionable features of similar type devices heretofore known and used. One particularly important feature of the present invention resides in the fact that the use of cooperable cradle-like support sections 24 and 26 of the support assembly 12 and the support sections 42 and 44 of the table carriage 18 provides an extremely rugged and stable construction and obviates the need for trunnion like support assemblies and cooperable support axles or shafts heretofore known and used in the art. Another feature of the present invention resides in the provision of the variable speed drive motors 124 and 170 which obviates the need for complicated gear trains and the like that have heretofore been utilized in related type rotary tilting tables. Still another feature of the present invention resides in the extremely compact construction of the rotary tilting table 10 which is accomplished without any sacrifice in stability or capability of handling large loads, with the particular cradle arrangement permitting the use of relatively large diameter support tables therewith, since the outer marginal edges of such tables may extend over or above the sides of the support assembly 12 without interfering therewith. Yet another feature of the present invention resides in the provision of the clamping mechanisms 190 and 206 which are adapted to positively fixedly secure the support table 16, and hence workpieces carried thereon, against any relative rotational, tilting or vibratory movement once the same have been positioned preparatory to a manufacturing operation to be performed on the workpieces.

While it will be apparent that the preferred embodiment illustrated herein is well calculated to fulfill the objects above stated, it will be appreciated that the present invention is susceptible to modification, variation and change without departing from the scope of the invention.

I claim:

1. In combination in a rotatable tilting workpiece support apparatus;

a support assembly including a generally flat, horizontally extending base section having a pair of spaced-apart cradle-like elements extending generally vertically upwardly therefrom, said elements having a pair of arcuate guideways defining a pair of support surfaces lying along the periphery of approximately a 90° sector of a common imaginary circular cylinder, the axis of which cylinder extends generally horizontally and is substantially coaxial of the tilting axis of the workpiece to be supported on the apparatus, a table assembly including a support table and a table carriage, said table carriage comprising an intermediate section and a pair of spaced-apart support sections of semi-circular shape and having a pair of bearing surfaces lying along sectors of a common imaginary circular cylinder of a radius approximately equal to the radius of said imaginary cylinder defining said first mentioned surfaces, each of said bearing surfaces being contiguously slidably engageable with one of said support surfaces whereby to provide for relative tilting movement of said table carriage relative to said support assembly, said support table comprising a generally flat circular face section providing a workpiece supporting surface and having means projecting toward said intermediate section of said table carriage for supporting said table for rotational movement relative thereto about an axis intersecting said tilting axis substantially at said workpiece supporting surface, and first and second drive means for selectively rotatably positioning said support table relative to said table carriage and selectively tiltably positioning said table assembly relative to said support assembly.

2. The combination as set forth in claim 1 which includes clamping means detachably securing said table relative to said carriage and for securing said table assembly relative to said support assembly so that an operation can be performed on a workpiece supported on said apparatus.

3. The combination as set forth in claim 1 wherein said drive means comprises fluid power operated means for selectively rotating said table relative to said table carriage.

4. The combination as set forth in claim 1 wherein said drive means comprises fluid power operated means for selectively tilting said table assembly relative to said support assembly.

5. The combination as set forth in claim 1 wherein said support table is of a generally flat disc-shaped configuration having a centrally disposed drive shaft, which includes a drive motor mounted on said carriage for selectively rotating said support table, and drive means operatively connecting said drive motor with said shaft.

6. The combination as set forth in claim 1 which includes a power operated motor for selectively tilting said table assembly with respect to said support assembly, and which further includes gear means operatively drivingly connecting said motor means with said table assembly.

7. The combination as set forth in claim 2 wherein said clamping means are operatively supported on said table carriage and are adapted for clamping engagement with the periphery of said support table.

8. The combination as set forth in claim 1 which includes fluid pressure operated clamping means operatively supported on said table carriage and adapted for clamping engagement with the periphery of said support table.

9. The combination as set forth in claim 1 wherein said support sections are disposed entirely below said support table when the latter is in a generally horizontal attitude, whereby the outer marginal edge portion of said support table may extend outwardly beyond said cradle-like support elements without interference therewith upon rotation of said table.

10. The combination as set forth in claim 1 wherein said first drive means comprises both power driven and manually actuatable means for selectively rotating said support table relative to said table carriage.

11. The combination as set forth in claim 1 wherein said second drive means comprises both power operated and manually actuatable drive means for selectively tiltably positioning said table assembly relative to said support assembly.

12. The combination as set forth in claim 1 wherein said first and second drive means comprise driven gear means on said support table and said table carriage, driving gear means drivingly engageable with said driven gear means, drive shaft means for driving said driving gear means, power operated means for selectively rotating said driving shaft means, and manually actuatable means for selectively rotating said drive shaft means.

13. The combination as set forth in claim 1 wherein said first drive means comprises a ring gear operatively secured to said support table and a worm gear drivingly engaged with said ring gear, and wherein said second drive means comprises a rack operatively secured to said table carriage and drive pinion drivingly engaged with said rack.

14. The combination as set forth in claim 1 which includes clamping means operatively secured to said support assembly for clampingly engaging marginal edge portions of said spaced-apart support sections of said table carriage for securing said table assembly at preselected tilted positions relative to said support assembly.

* * * * *